June 16, 1964 K. T. KÄLLE 3,137,136
REGULATOR
Filed Sept. 28, 1962

Karl Torsten Källe, Inventor
By Wenderoth, Lind and Ponack
Attorneys

United States Patent Office 3,137,136
Patented June 16, 1964

3,137,136
REGULATOR
Karl Torsten Källe, Sandbacken, Saffle, Sweden
Filed Sept. 28, 1962, Ser. No. 226,885
2 Claims. (Cl. 60—52)

The invention relates to a regulator of the type which comprises a rotary pump, means for supplying liquid and gas to the pump in proportions determined by a condition to be regulated, a passage connecting the pressure side of the pump to a hydraulic servo motor adapted to set a regulating member, and a branched outlet from said passage to vent the gas therefrom.

Within the modern technics the requirements for an increased speed of control are successively increased. In the regulator indicated above the outlet from the conduit between the pump and the servo motor has been provided with a restricted passage adapted to secure a desired pressure during the power stroke of the servo motor. However, this restricted passage causes a certain delay of time. Thus, when the pump delivers a liquid-gas mixture rich in liquid to energize the servo motor, the operation is delayed, as a portion of the liquid supplied escapes through the outlet together with the gas. On the other hand, when the proportion of liquid in said liquid-gas mixture is descreased to permit the servo motor to perform a return stroke, said operation is delayed, as the whole excess of liquid in the servo motor must now be forced through the restricted passage.

The invention has for its object to provide an improved passage between the pump and the servo motor, whereby a considerably increased speed of regulation can be reached. For that purpose, a first section of said passage is designed as a nozzle ending into a radially widened, second section and directed onto the inlet of a third section which extends to the servo motor and has a diameter only a little greater than that of the nozzle opening, said second section being provided with a venting outlet.

During the power stroke the required hydraulic pressure in the servo motor is generated by the energy of motion of the jet directed from the nozzle into the inlet of the servo motor. As said inlet may be dimensioned to receive the whole jet, no pressure liquid need be lost. At the same time the contraction of the jet close to the nozzle opening results in an effective degasifying action in the widened section of the passage. During the return stroke the servo motor can rapidly discharge the excess of liquid, as the outlet does not need to contain any restriction. It may be noted that the inlet to the servo motor can have a cross section area considerably greater than that of the restricted passage provided in the branched outlet of the prior art.

Further features and advantages of the invention will be apparent from the following description of an embodiment shown in the drawing.

Figure 1:
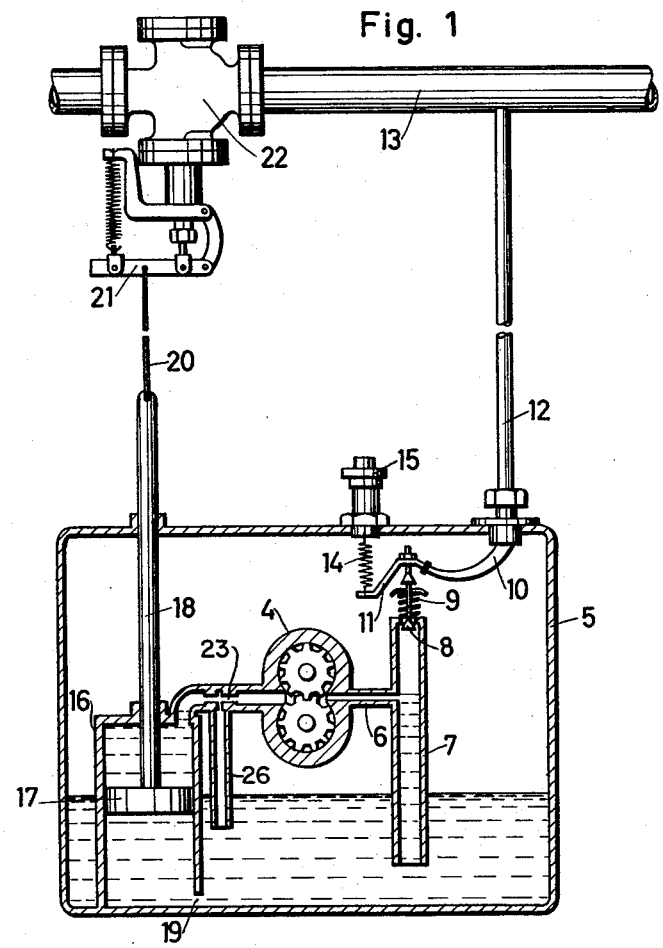
FIGURE 1 shows a vertical section through a regulator provided with the new device. As an example, the regulator is shown mounted to control the pressure in a steam conduit.

For the sake of simplicity, FIG. 1 shows the invention applied to a regulator of a rather elementary design known since long ago, but obviously the new device may in the same manner be inserted also in more complicated regulators of the type indicated.

A gear pump 4 connected to an electric motor (not shown) is mounted within a housing 5 partly filled with liquid (oil). A substantially horizontal suction conduit 6 extends from a vertical tube 7 to the suction side of the pump. The lower end of the tube 7 is immersed in the liquid, while the upper tube end is provided with a valve for supply of air. Thus, this tube end is formed with a seat cooperating with a conical valve member 8. The spindle 9 of the valve cone 8 is suspended in an extension arm 11 fixed to the movable end of a bourdon pipe 10. The opposite end of said pipe 10 is secured to a support provided on the top wall of the housing 5, and a pipe 12 connects this tube end to a steam conduit 13 in which the pressure is to be kept constant. The arm 11 carrying the valve cone 8 is, moreover, connected to a set screw 15 by means of a spring 14, whereby the regulator may be adjusted to keep the pressure in the conduit 13 at a desired value.

A passage or conduit designed according to the invention and further described hereinafter connects the pressure side of the pump 4 to the top of a servo cylinder 16 containing a piston 17, the rod 18 of which extends upwards through the cylinder and the housing 5. The lower end of the cylinder 16 communicates with the liquid within the housing 5 through an opening 19. A wire 20 connects the upper end of the piston rod 18 to a spring-loaded lever 21 mounted to move a slide valve 22 inserted in the steam conduit 13.

Figure 2:
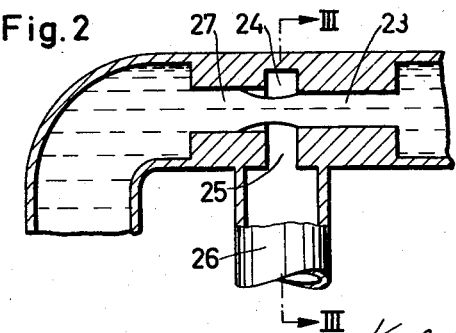
FIGURE 2 shows a longitudinal section through the new device on an enlarged scale.
Figure 3:
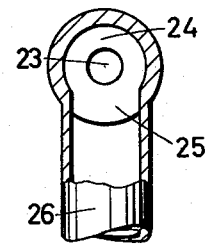
FIGURE 3 shows a cross section on the line III—III in FIG. 2.

As shown in FIG. 2, the passage from the pump 4 to the servo cylinder 16 includes a nozzle 23 which ends into a rather short coaxial section 24 of considerably greater diameter. As also appears from FIG. 3, the widened section 24 has a radial outlet 25 directed downwards and preferably connected to a pipe 26 which ends below the liquid level in the housing 5. The nozzle 23 is dimensioned such in relation to the capacity of the pump that the jet coming therefrom has an essential energy of motion. The jet is directed into the inlet end of a channel 27 extending from the opposite wall of the widened section 24 to the servo cylinder 16. The channel 27 must have a diameter at least as great as that of the nozzle 23 and preferably a little greater, whereby it can receive the jet without losses even in case the pump delivers liquid only. On the other hand, the cross section area of the channel 27 must not be oversized, as then the desired hydraulic pressure could not be reached in the cylinder 16. The best effect is obtained, if the nozzle 23 and the channel 27 are exactly in alignment to each other but a minor angle between them is possible without risk for a too great loss of energy. The widened space 24 may have an axial length equal to or possibly twice as great as the diameter of the orifice of the nozzle 23.

As known, a jet is subjected to a contraction when leaving the orifice of a nozzle. With the present construction the air separates from the liquid in the jet and escapes to the annular space formed around the jet in the widened section 24, and from this space it is then vented through the pipe 26. Experiments have shown that the liquid introduced into the servo cylinder 16 is nearly free from air so that a desired incompressible medium is obtained for carrying out the work of regulation.

It may be assumed, for instance, that the pressure in the steam conduit 13 drops so that the valve member 8 is throttled to cause the pump 4 to feed a mixture more rich in liquid. The jet, freed from air in the space 24, will consequently be of a greater mass and thus an increased pressure is generated in the channel 27 so that liquid is forced into the cylinder 16. When no, or only very little, air is supplied to the pump 4, the jet may even be so powerful that the channel 27 acts as an injector, i.e. liquid sucked through the pipe 26 is drawn into the cylinder 16, where the pressure thus may approach the value of the pressure in the nozzle 23. As already mentioned, the effective use of the whole amount of liquid fed by the pump results in an increased speed of operation of the servo motor, and the desired effect is further improved due to the additional supply of liquid caused by the injector action in the channel 27.

If, instead, the amount of air is increased in the mixture fed by the pump, the mass of the jet will be reduced so that the pressure drops in the cylinder 16. The piston 17 now moves upwards so that liquid is discharged from the cylinder 16 through the channel 27 and pipe 26. The cross section area of 27 (and 26) may be great enough to permit a relatively rapid return movement.

A further and at least in some cases valuable property of the new device is that the jet pressure in the channel 27 sinks to an ineffective value before the proportion of air is predominant in the liquid-gas mixture pumped. Owing to this, the device will be especially suited for use in regulators constructed to operate with liquid-gas mixtures containing relative small amounts of air.

What I claim is:

1. A regulator comprising a rotary pump, means for supplying liquid and gas to the pump in proportions determined by a condition to be regulated, a passage connecting the pressure side of the pump to a hydraulic servo motor adapted to set a regulating member, and a branched outlet from said passage for venting gas therefrom, characterized in that a first section of the passage is designed as a nozzle ending into a radially widened, second section and directed into the inlet of a third section which extends to the servo motor and has a diameter only a little greater than that of the nozzle opening, said second section being provided with the venting outlet.

2. A regulator as claimed in claim 1, in which the venting outlet is connected to a pipe dipping into a source of liquid.

References Cited in the file of this patent

UNITED STATES PATENTS

| | | |
|---|---|---|
| 2,438,245 | Gregg | Mar. 23, 1948 |
| 2,598,177 | Kalle | May 27, 1952 |

FOREIGN PATENTS

| | | |
|---|---|---|
| 173,763 | Sweden | Dec. 20, 1960 |